Patented Apr. 7, 1925.

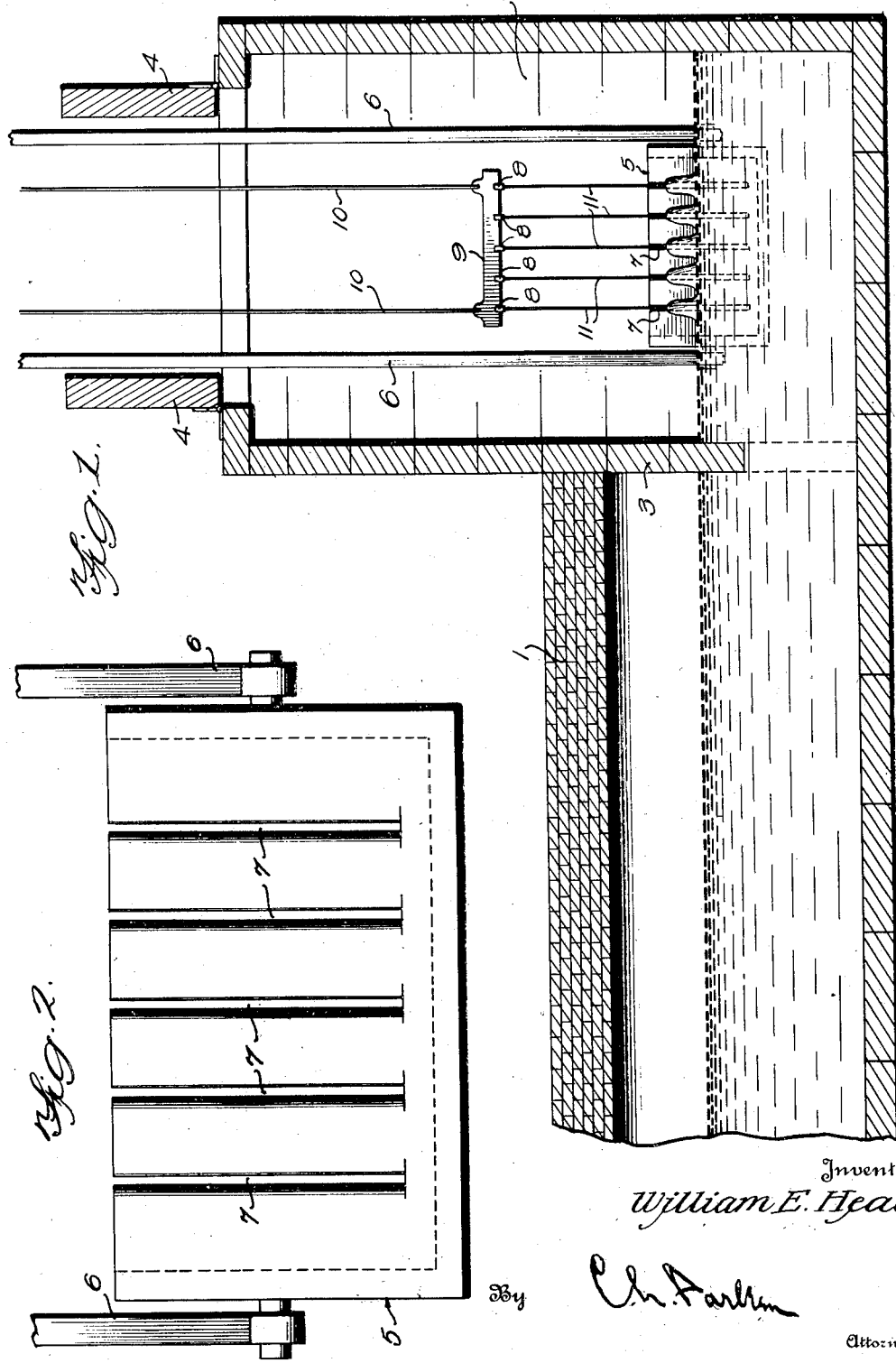

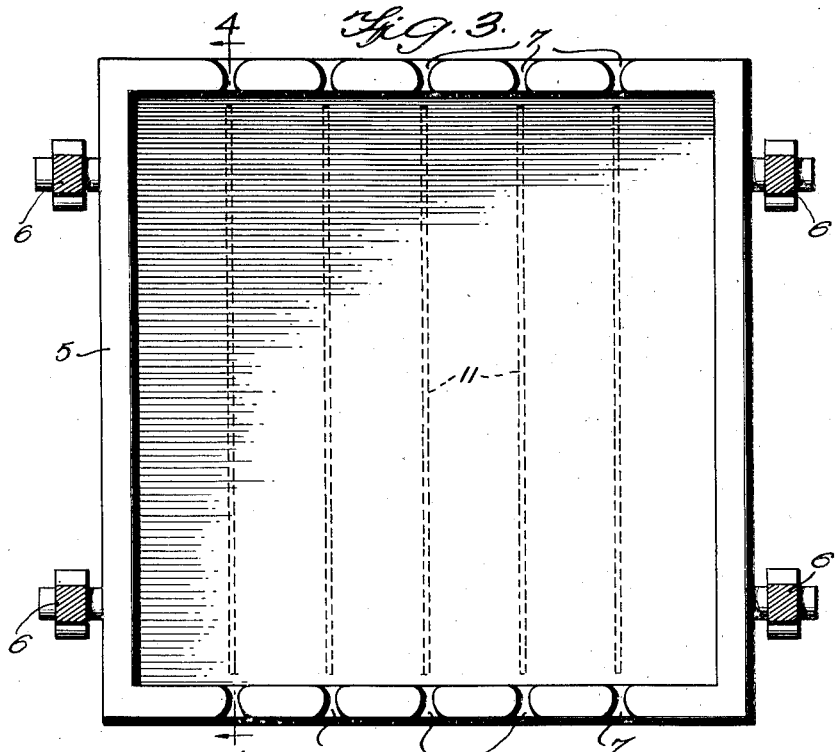
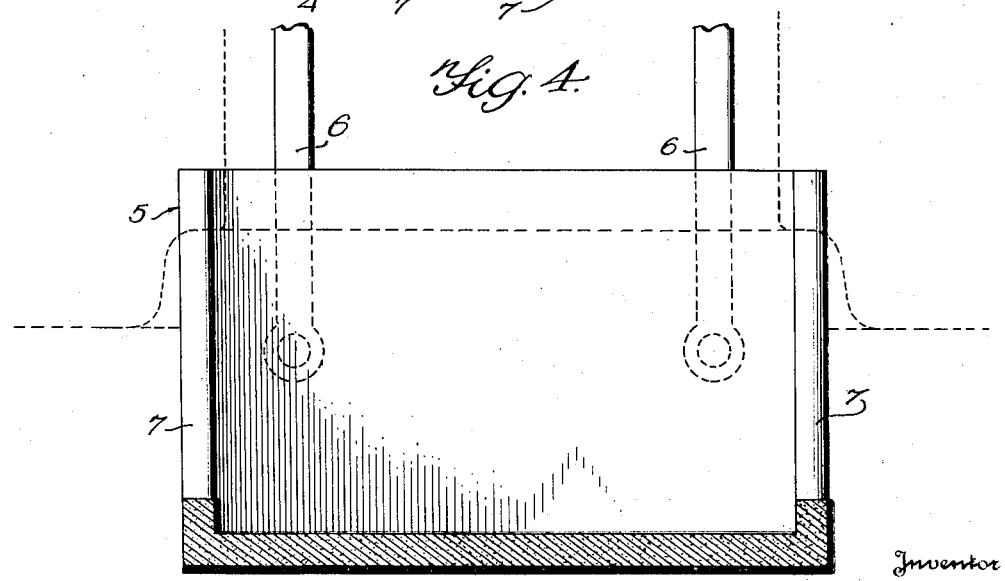

1,532,182

UNITED STATES PATENT OFFICE.

WILLIAM E. HEAL, OF WASHINGTON, DISTRICT OF COLUMBIA.

METHOD OF DRAWING GLASS AND APPARATUS THEREFOR.

Application filed March 27, 1923. Serial No. 628,134.

*To all whom it may concern:*

Be it known that I, WILLIAM E. HEAL, a citizen of the United States, residing at Washington, in the District of Columbia, have invented certain new and useful Improvements in Methods of Drawing Glass and Apparatus Therefor, of which the following is a specification.

This invention relates to methods of drawing glass, and apparatus therefor.

In drawing glass by means of baits, there is a tendency for the drawn sheet of glass to contract or narrow because of the surface tension of the drawn, semi-fluid glass. This produces a sheet having irregular and uneven side edges.

In the present method, I draw the glass from a container and establish a counter current by permitting some of the semi-fluid body of glass to flow from the container by gravity in the opposite direction to the direction in which the glass is drawn. In the present invention, I further provide an apparatus particularly suitable for use in performing the process, consisting of a box-like receptacle or compartment having a plurality of vertical slots in its side walls. This receptacle is adapted to be lowered into a tank of glass and then raised within the tank above the body of glass. The baits are then permitted to contact with the glass in the receptacle and drawn upwardly. As the glass is drawn upwardly, the part of the body of glass within the receptacle flows through the slots in the walls, establishing a counter current which overcomes the tendency of the glass to contract or narrow. The strength of the counter current may be controlled by regulating the distance that the receptacle is raised.

In the accompanying drawings, I have shown an organization of apparatus elements particularly suitable for use in practicing the process. In this showing:

Figure 1 is a vertical longitudinal sectional view of a furnace showing the receptacle therein, Figure 2 is a side elevation of the receptacle, Figure 3 is a plan view thereof, and, Figure 4 is a transverse sectional view on line 4—4 of Figure 3.

Referring to the drawings, the reference numeral 1 designates the main compartment of a glass furnace in which the glass is heated by any suitable means (not shown) to the desired temperature. An auxiliary chamber 2 is arranged at one end of the tank or furnace, and is separated therefrom by a partition wall 3. As shown, the partition wall does not extend entirely to the bottom of the tank, which permits the fluid glass to flow into the chamber 2. Doors 4 are provided at the top of the chamber for closing it.

A box-like receptacle 5 is supported on suitable hangers 6, and is adapted to be lowered into the body of glass in the bottom of the chamber 2. This receptacle is provided with a plurality of vertical slots 7 arranged in the walls on opposite sides thereof. A plurality of baits 8 are secured to a suitable support 9 and are adapted to be raised and lowered by connecting members 10. The sheets of glass formed in the drawing operation are indicated in Figure 1 of the drawings by the reference numeral 11.

In practicing the process, the glass is first heated to the desired temperature and the receptacle 5 is then lowered through the doors of the cooling chamber until it is submerged in the glass. It is then raised slightly above the surface of the glass, as shown in Figure 1 of the drawings. The glass in the upper part of the receptacle will then tend to flow through the slots 7. The baits 8 are lowered into contact with the glass in the receptacle and are drawn upwardly in the usual manner to form the sheets 11. It will be apparent that the flow of glass from the receptacle through the slots 7 establishes a counter current to the glass moving upwardly to form the sheets 11. As stated, there is a tendency in drawing glass for the sheet to contract or narrow at its side edges due to surface tension. The counter current established by the flow of glass through the slots 7 overcomes this tendency and produces a sheet of uniform width and thickness. The strength of the counter current may be controlled by regulating the height of the receptacle in the chamber 2.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described my invention, I claim:

1. The method of drawing glass which comprises lowering a box-like receptacle having spaced slots in its side walls, into a body of molten glass, raising said receptacle and maintaining it above said body of molten glass whereby the glass in said receptacle will tend to flow through said slots by gravity and return to said body of molten glass, and drawing sheets of glass from the glass in said receptacle.

2. In an apparatus of the character described, a tank adapted to contain a body of molten glass, a vertically movable receptacle adapted to be lowered into said tank to receive a charge of glass, means for vertically moving said receptacle, said receptacle being provided with vertical slotted walls whereby the glass contained therein will flow from said receptacle by gravity when the receptacle is elevated, and a bait adapted to contact with the surface of the glass in the receptacle.

3. In a device of the character described, a receptacle for use in forming sheet glass comprising a box-like casing having a plurality of spaced, vertical slots extending through opposite walls.

In testimony whereof, I affix my signature.

WILLIAM E. HEAL.